(No Model.)

W. H. MERCER.
COTTON CHOPPER.

No. 279,966. Patented June 26, 1883.

Witnesses.
Louis F. Gardner
J. W. Garner

Inventor.
Wm. H. Mercer
per F. A. Lehmann
Atty ic
UNITED STATES PATENT OFFICE.

WILLIAM H. MERCER, OF MERCER, SOUTH CAROLINA.

COTTON-CHOPPER.

SPECIFICATION forming part of Letters Patent No. 279,966, dated June 26, 1883.

Application filed April 4, 1883. (No model.)

*To all whom it may concern:*

Be it known that I, WM. H. MERCER, of Mercer, in the county of Union and State of South Carolina, have invented certain new and useful Improvements in Cotton-Choppers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton choppers or thinners; and it consists in the combination of the scrapers, which are provided with curved fingers or other suitable devices which extend down into the ground below the scrapers, so as to catch against any obstruction against which the scrapers would be apt to strike, for the purpose of causing them to give backward, and thus prevent it from being injured.

The object of my invention is to provide a machine which is to be driven across the rows of growing plants and which is provided with wheels arranged in pairs and located between the scrapers for the purpose of protecting the growing plants from injury, and to provide means for preventing the scrapers from being broken in coming in contact with any obstruction.

Figure 1:
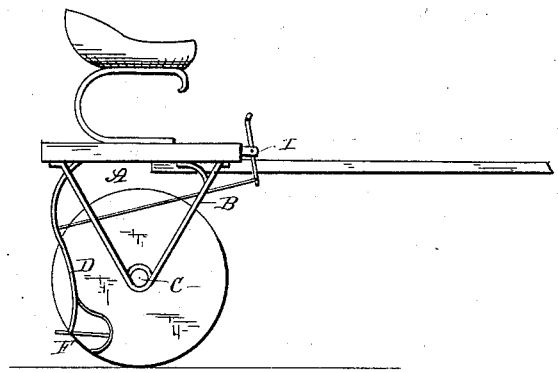
Figure 2:
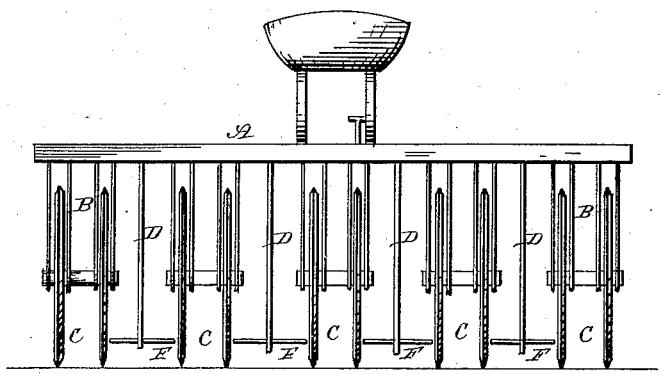

Figure 1 is an end view of a machine embodying my invention. Fig. 2 is a rear view of the same.

A represents a suitable frame, of any desired shape or construction, and which is to be made either long enough to be used with two horses or short enough to be used with only one. Secured to the under side of this frame are a number of hangers, B, in the lower ends of which are journaled the wheels C. These wheels are arranged in pairs, as shown, and will be separated just far enough apart to allow the plants which are to be preserved to pass in between them. The edges of these wheels may either be made sharp, so as to cut shoulders on each side of the row of growing plants, or may be provided with shoulders or flanges on their outer sides to keep them from sinking too deep into the earth. Secured to the under side of the frame, midway between these wheels, are the standards D, to the lower ends of which are secured the scrapers F. These standards D may be curved and made of any elastic material, so that the scrapers can readily give backward when they strike an obstruction, or they may be pivoted or hinged and then be forced forward in position by means of springs, which are applied to them in any suitable manner. These scrapers will be of a sufficient width to cut away or chop the plants which may be growing in between the pairs of wheels. In order to prevent these scrapers from being injured in case they strike against any obstruction, there is a finger, prong, or projection, which is either attached to or formed with the standard, and which prejects down in front of the scraper, so as to come in contact with an obstruction of any kind before the scraper has time to reach it. As the lower end of this prong or finger is made curved, as shown, it forces the standard backward, so that the scraper rides over the top of the obstruction without injury.

Upon the top of the frame will be made a suitable seat for the driver. In order to enable him to control the scrapers at will, a rod, I, is journaled upon the front of the frame, and to this rod is connected a foot-lever. From this rod to each standard extends a rod or brace, by means of which the standards can be raised above the ground at the will of the driver. When the pressure of the driver's foot is removed from the foot-lever, the scrapers sink back into position again.

Where the machine is made for a single horse, as the weight of the driver would be too great, the frame will be provided with handles, and the driver will then have to walk behind the machine as it moves along. In this case a connecting rod or lever will then extend back of the handles, where the driver can readily control it for the purpose of raising the scrapers upward.

Having thus described my invention, I claim—

1. In a cotton chopper or thinner, the combination of the scrapers with curved prongs or fingers, which extend forward in front of the scrapers, with the protecting-wheels arranged upon each side of the scrapers, and a mechanism for raising and lowering the scrapers, substantially as shown.

2. The combination of the scrapers with a curved prong or finger, which extends forward in front of the scrapers, so as to protect the scrapers from injury by forcing their standards backward when an obstruction is encountered, substantially as set forth.

In testimony whereof I affix my signature in presence of two witnesses.

W. H. MERCER.

Witnesses:
F. A. LEHMANN,
W. S. D. HAINES.